(12) United States Patent
Hsia

(10) Patent No.: US 6,402,225 B1
(45) Date of Patent: Jun. 11, 2002

(54) CANOPY WINDSHIELD OF STROLLER

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 0 days.

(21) Appl. No.: 09/843,666

(22) Filed: Apr. 26, 2001

(51) Int. Cl.⁷ .............. B60J 7/11; B60J 7/12; B26B 7/00
(52) U.S. Cl. .............. 296/107.02; 296/77.1; 296/97.1
(58) Field of Search .......... 296/77.1, 79, 97.21, 296/107.02

(56) References Cited

U.S. PATENT DOCUMENTS

| 247,424 | A | * | 9/1881 | Shoeninger | 296/77.1 |
| 758,185 | A | * | 4/1904 | Lawless | 296/79 |
| 778,330 | A | * | 12/1904 | Pond | 296/79 |
| 1,092,225 | A | * | 4/1914 | Ragsdale | 296/83 |
| D429,664 | S | * | 8/2000 | Gehr | D12/129 |

FOREIGN PATENT DOCUMENTS

| GB | 0211578 | * | 2/1924 | 296/77.1 |
| GB | 0860361 | * | 2/1961 | 296/77.1 |

* cited by examiner

Primary Examiner—Stephen T. Gordon
Assistant Examiner—Hilary Gutman
(74) Attorney, Agent, or Firm—Raymond Y. Chan; David and Raymond Patent Group

(57) ABSTRACT

A canopy windshield of a stroller, which includes a front shelter having a first edge attached to a front edge of a canopy shield supported by a canopy frame of the stroller and a second edge extended away from the first edge to define a shelter portion therebetween for sheltering a front portion of a seat frame of the stroller. A resilient element is mounted on the second edge of the front shelter for applying a tension force on the front shelter so as to retain the front shelter between a folded position and an unfolded position. In the folded position, the resilient element is bent inwardly to force the front shelter overlapped on an interior side of the canopy shield. In the unfolded position, the resilient element is bent outwardly to tensely extend the front shelter frontwardly and downwardly from the front edge of the canopy shield.

30 Claims, 5 Drawing Sheets

CANOPY WINDSHIELD OF STROLLER

BACKGROUND OF THE PRESENT INVENTION

1. Field of Invention

The present invention relates to strollers, and more particularly to a canopy windshield for a stroller which is adapted for foldably extending frontwardly to overhanging cover a front portion of a seat frame of the stroller, so as to protect a young child being hurt, especially by wind, rain, or dust entering in the front of the stroller, when he or her supported on the seat frame.

2. Description of Related Arts

Stroller, which is becomes a necessity to every family having a young child or baby, is considered as a conveniences tool to carry the baby or young child during outdoor activities, such as foot traveling or shopping. So, the stroller must not only well support the baby therein but also protect any external object such as dust, sand, or rain entering into the stroller to hurt the baby.

Referring to FIG. 1, a conventional stroller comprises a foldable canopy supported on top of a seat frame of the stroller wherein the canopy, which is adapted for foldably extending frontwardly for shading a baby under the sunlight or sheltering from drizzling. However. the canopy can only cover a top portion of the seat frame such that when there is a dusty wind or rainy day, the dust or rain may still enter into the stroller from a front portion thereof.

SUMMARY OF THE PRESENT INVENTION

A main object of the present invention is to provide a canopy windshield of stroller which is adapted for foldably extending to cover a front portion of a stroller so as to protect a child from the front.

Another object of the present invention is to provide a canopy windshield of stroller wherein the canopy windshield comprises a front shelter adapted for extending frontwardly by means of a resilient element.

Another object of the present invention is to provide a canopy windshield of stroller wherein the front shelter is reinforced to fold on an interior side of a canopy shield so as to prevent the front shelter from being outwardly unfolded accidentally.

Another object of the present invention is to provide a canopy windshield of stroller wherein the canopy windshield does not require to change the original structural design of the stroller, so as to minimize the manufacturing cost of the stroller incorporating with the canopy windshield.

Another object of the present invention is to provide a canopy windshield of stroller which may be detachably attached to the canopy of the stroller so that the user may remove the windshield anytime or replace a transparent windshield to a non-transparent one while the baby is sleeping.

Accordingly, in order to accomplish the above objects, the present invention provides a canopy windshield of a stroller which comprises a seat frame for supporting a child thereon, and a canopy assembly which comprises a canopy frame supported on the seat frame and a canopy shield which is supported by the canopy frame to position above the seat frame for shading a top portion of the seat frame:

wherein the canopy windshield comprises:
a front shelter, which has a segment-liked shape, having a first edge attached to a front edge of the canopy shield in edge to edge manner and a second edge extended away from the first edge to define a shelter portion therebetween for sheltering a front portion of the seat frame, and a resilient element mounted on the second edge of the front shelter in C-shaped manner for applying a tension force on the front shelter so as to retain the front shelter between a folded position and an unfolded position, wherein in the folded position, the resilient element is bent inwardly to force the front shelter overlapped on an interior side of the canopy shield, and in the unfolded position, the resilient element is bent outwardly to tensely extend the front shelter frontwardly and downwardly from the front edge of the canopy shield.

DETAILED DESCRIPTION OF THE PREFERRED EMBODIMENT

Figure 1:
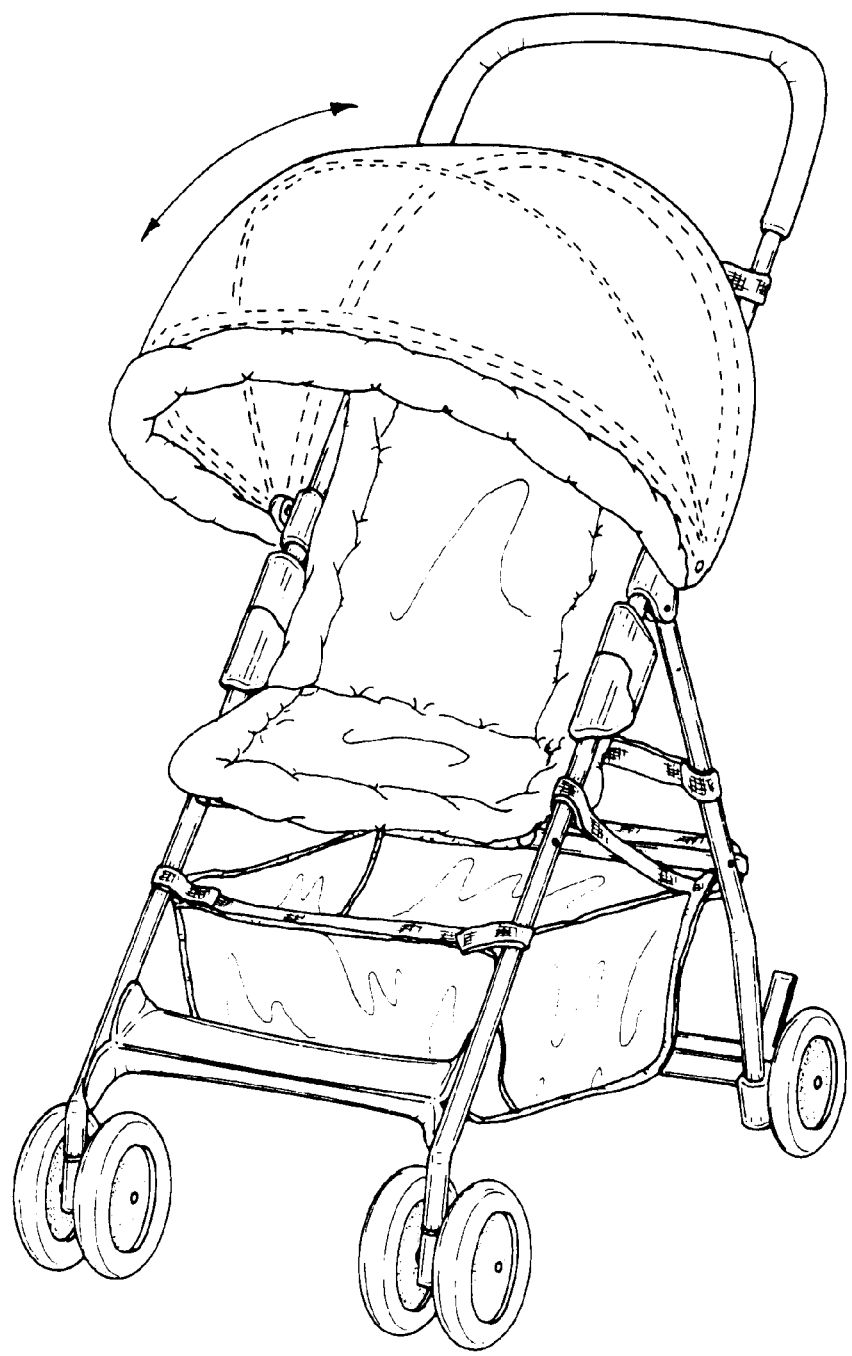
FIG. 1 is a perspective view of a conventional stroller.
Figure 2:
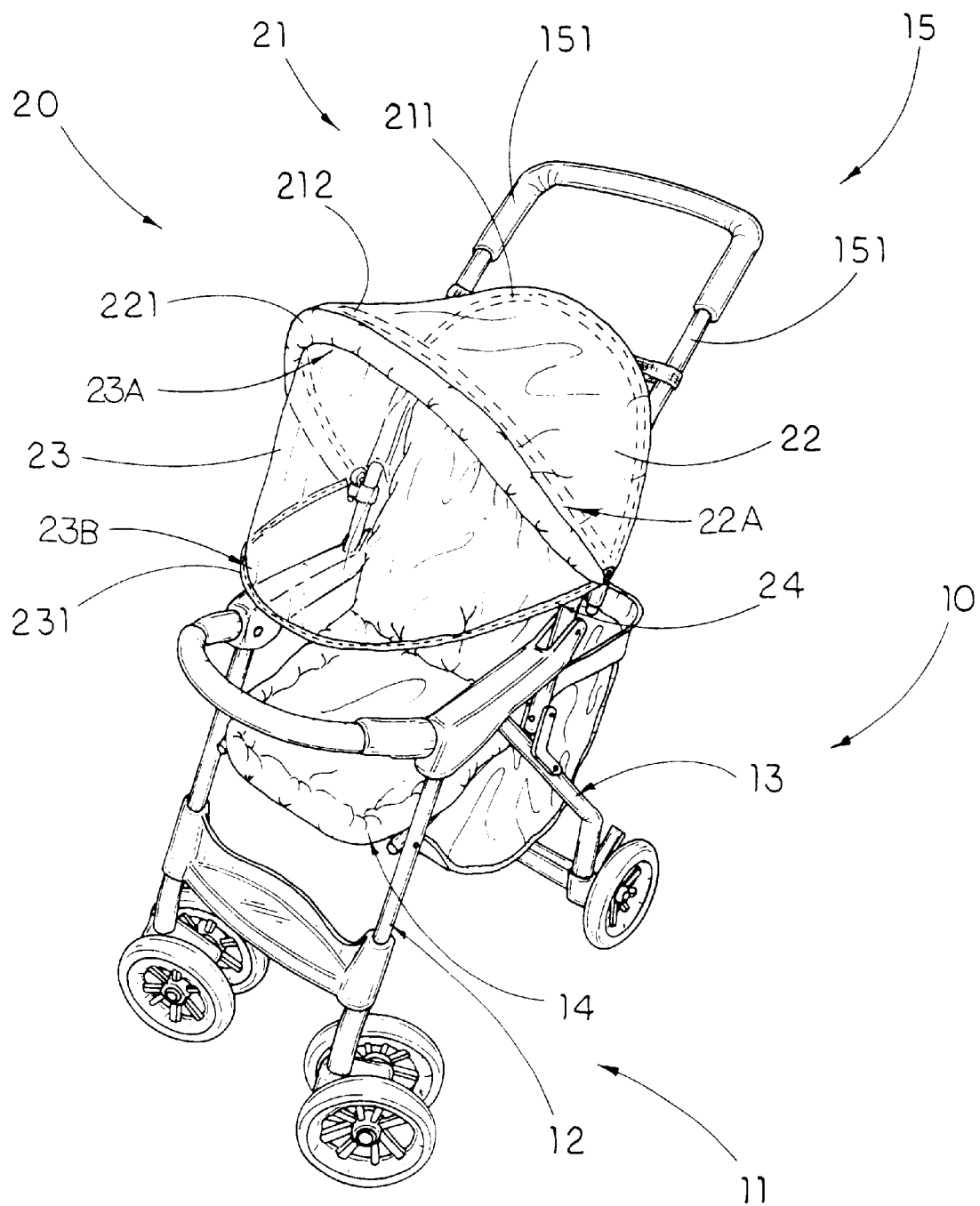
FIG. 2 is a perspective view of a canopy windshield of a stroller according to a preferred embodiment of the present invention.

Referring to FIG. 2 of the drawings, a canopy windshield 20 of the stroller 10 according to a preferred embodiment of the present invention, wherein the stroller 10, such as a standard stroller, comprises a supporting frame 11 comprising a front frame 12, a back frame 13, and a seat frame 14 having a seat fabric supported by the front frame 12 and the back frame 13 for a child supported on the seat frame 14, and a U-shaped handle frame 15 having two handle bars 151 upwardly extended from the supporting frame 11.

The stroller 10 further comprises a canopy frame 21 supported on the seat frame 14 and a canopy shield 22 made of washable fabric is supported by the canopy frame 21 to position above the seat frame 14 for shading a top portion of the seat frame 14.

The canopy windshield 20 of the stroller 10 comprises a front shelter 23 and a resilient element 24. The front shelter 23, having a segment-liked shape, has a first edge 23A attached to a front edge 22A of the canopy shield 22 in edge to edge manner and a second edge 23B extended away from the first edge 23A to define the front shelter 23 therebetween for sheltering a front portion of the seat frame 14.

Figure 3:
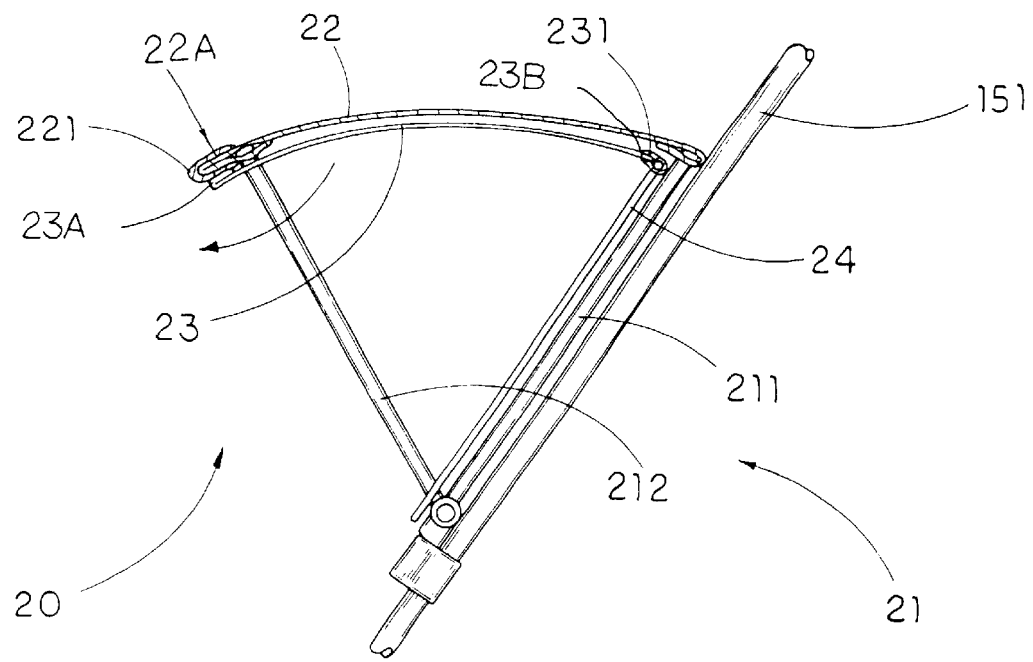
FIG. 3 is a sectional view of the canopy windshield of the stroller in a folded condition according to the above preferred embodiment of the present invention.
Figure 4:
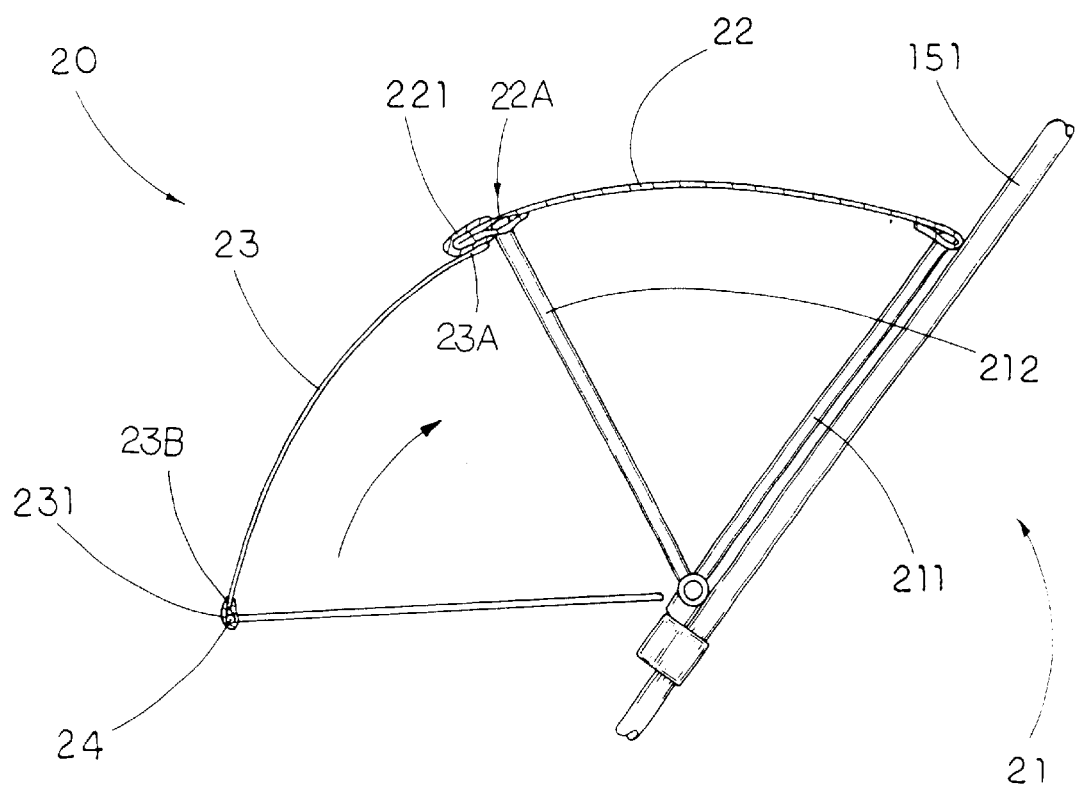
FIG. 4 is a sectional view of a front shelter of the canopy windshield in an unfolded condition according to the above preferred embodiment of the present invention.
Figure 5:
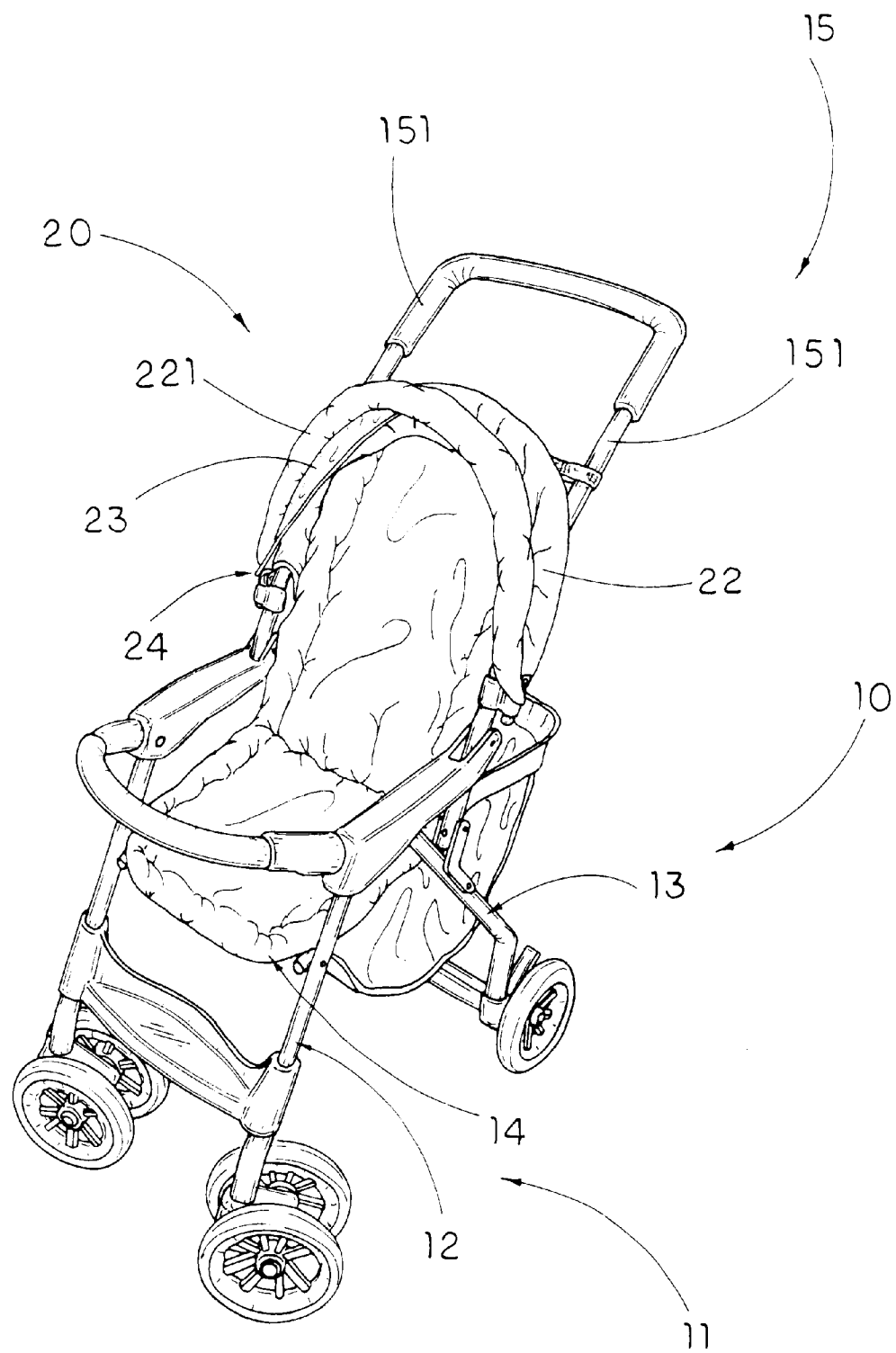
FIG. 5 is a perspective view of the canopy windshield in a folded condition according to the above preferred embodiment of the present invention.

According to the preferred embodiment, the resilient element 24 can be bent to a C-shaped manner and mounted along the second edge 23B of the front shelter 23 for applying a tension force on the front shelter 23 so as to retain the front shelter 23 between a folded position and an unfolded position. In the folded position, the resilient element 24 is bent inwardly to force the front shelter 23 overlapped on an interior side of the canopy shield 22, as shown in FIGS. 3 and 5. In the unfolded position. the resilient element 24 is bent outwardly to tensely extend the front shelter 23 frontwardly and downwardly from the front edge 22A of the canopy shield 22 so as to retain the front shelter 23 in an arc shaped manner, as shown in FIGS. 2 and 4.

According to the preferred embodiment, the canopy windshield 20 is supported on the handle frame 15 wherein the canopy frame 21 comprises an arc-shaped back supporting arm 211 transversely mounted on the handle frame 15 and a corresponding arc-shaped front supporting arm 212 having two ends pivotally connected to two ends of the back supporting arm 211 respectively wherein the canopy shield 22 having a predetermined shaped is fittedly supported between the back supporting arm 211 and the front supporting arm 212 in such a manner that the canopy shield 22 is adapted for being folded by pivotally rotating the front supporting arm 212 towards to the back supporting arm 211, as shown in FIG. 5.

As shown in FIG. 2, the front shelter 23 is embodied to be integrally connected to the front edge 22A of the canopy shield 22, so that the front shelter 23 can be extended from the front edge 22A of the canopy shield 22 and thus the front shelter 23 is capable of overhanging extending for sheltering the front portion of the seat frame 14. According to this preferred embodiment, the first edge 23A of the front shelter 23 is permanently stitched to the front edge 22A of the canopy shield 22 in the edge to edge manner so as to prevent the front shelter 23 from accidentally detaching from the canopy shield 22, especially pulling by the young child.

Accordingly, the front shelter 23 is preferably made of transparent plastic material having a flexible ability such that when the young child is able to view the front through the front shelter 23 when the front shelter 23 is extended frontwardly and unfolded downwardly. Alternatively, the front shelter 23 can be made of any fabric which functions as the windshield for protecting the young child sat in the seat frame 14. If the front shelter 23 can be made non-transparent material, it can be used to better shelter all the sunlight or other outside lightsource when the baby is sleeping inside.

The canopy shield 22 comprises a reinforcing pad 221 attached along the front edge 22A thereof, wherein the first edge 23A of the front shelter 23 is preferred to be attached along the reinforcing pad 221 so as to affix the front shelter 23 to the canopy shield 22. The reinforcing pad 221 not only is adapted for retaining and reinforcing the shape of the front shelter 23, but also functions as a cushion for providing space for the front shelter 23 to fold between the folded position and the unfolded position. In other words, the second edge 23B and the first edge 23A of the front shelter 22 are reinforced by the resilient clement 24 and the reinforcing, pad 221 respectively, so as to tense the front shelter 22 in fully extended manner.

The resilient element 24 normally applies the tension force on the front shelter 23 so as to retain the front shelter 23 between the folded position and the unfolded position. In the folded position as shown in FIG. 3, the resilient element 24 is bent inwardly to force the front shelter 23 overlapped on an interior surface of the canopy shield 22. In the unfolded position as shown in FIG. 4, the resilient element 24 is bent outwardly to tensely extend the front shelter 23 frontwardly so as to overhanging shelter the front portion of the seat frame 14.

According to the preferred embodiment of the present invention, the resilient element 24, which is a bendable elastic wire made of metal or other elastic material, is mounted along the front edge 22A of the front shelter 23 and arranged in a C-shaped manner. Since the resilient element 24 is preferred to have a length slightly shorter than a length of the front edge 22A of the front shelter 23, the resilient element 24 is adapted for freely bending between the folded position and the unfolded position respectively.

A curvature of the C-shaped resilient element 24 should match to that of the canopy shield 22 in such a manner that the front shelter 23 is fittedly overlapped on the interior side of the canopy shield 22 in the folded position. Thus, the front shelter 23 has a maximum size equal to a size of the canopy shield 22 such that the front shelter 23 is fully overlapped on the interior side of the canopy shield 22 in the folded position. In other words, the curvature of the resilient element 24 is equal to that of the back supporting arm 211 of the canopy frame 21, which is the curvature of the canopy shield 22 such that the resilient element 24 is encirclingly aligned with the back supporting arm 211 when the front shelter 23 is folded towards to the canopy shield 22, as shown in FIG. 4.

The front shelter 23 has a protective brim 241 having a U-shaped cross section attached along the front edge 22A of the front shelter 23, wherein the resilient element 24 is received in the protective brim 231 so as to retain the resilient element 24 on the front edge 22A of the front shelter 23 and prevent the shape of the front shelter 23 from being distorted.

In order to unfold the front shelter 23, a user simply apply a pulling force on the resilient element 24 intentionally to bend the resilient element 24 outwardly wherein the front shelter 23 is arranged to pull frontwardly so as to overhanging shelter the front portion of the seat frame 14. Likewise, to fold the front shelter 23, a pushing force can be intentionally applied on the resilient element 24 to bend the resilient element 24 inwardly in a twisting manner such that the front shelter 23 is folded on the interior side of the canopy shield 22. Thus, since the front shelter 23 is made of flexible material, the canopy shield 22 can be folded up by pulling the front supporting arm 212 towards to the back supporting arm 212 so as to fold up the canopy windshield 20, as shown in FIG. 5.

Moreover, it can be designed to such a manner that the young child does not have sufficient power to bend the resilient element 24 inwardly and outwardly so as to prevent the young child from operating by himself or herself and being hit by the resilient element 24 accidentally.

Figure 6:
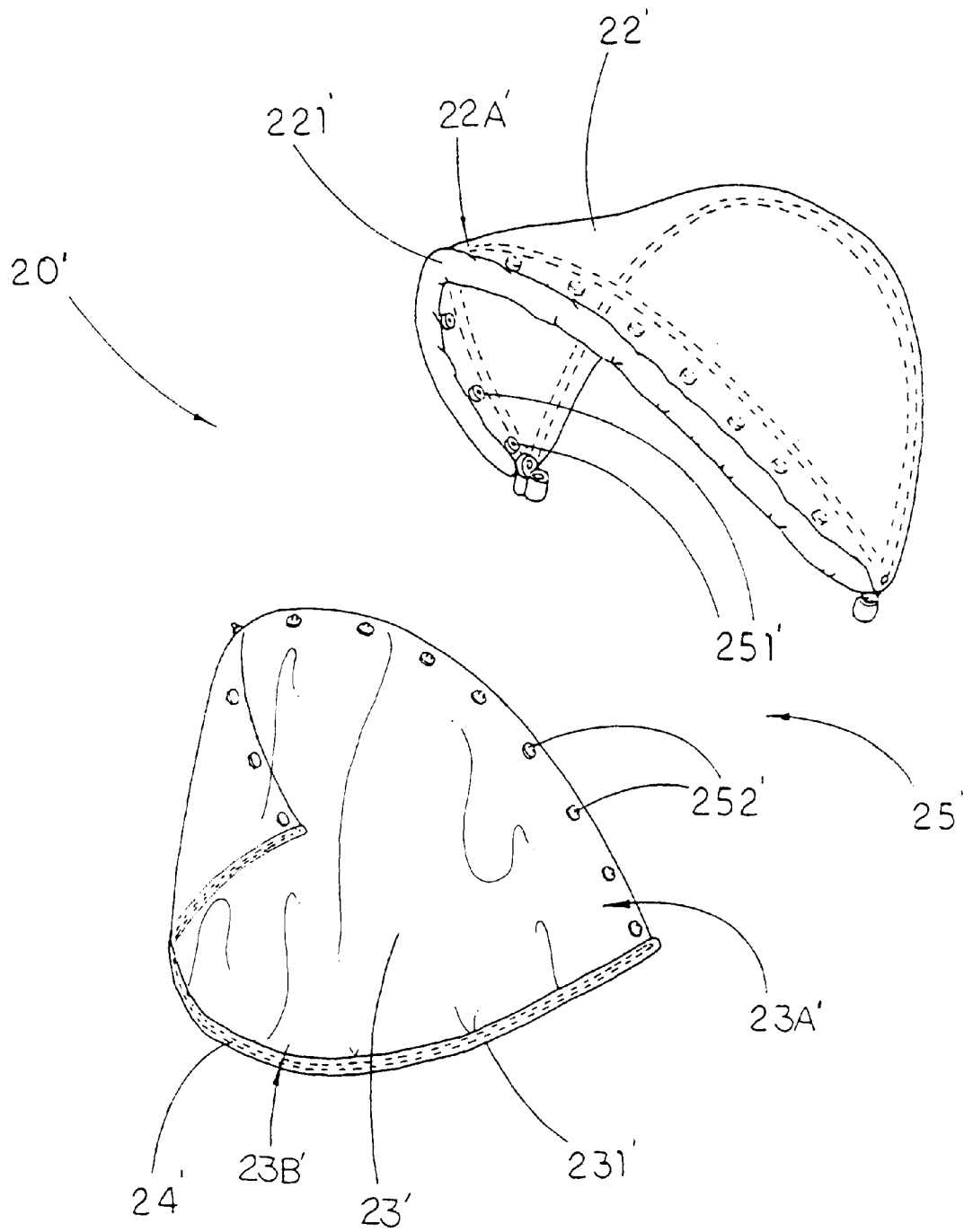
FIG. 6 illustrates an alternative mode of the canopy windshield according to the above preferred embodiment of the present invention.

As shown in FIG. 6, an alternative mode of the preferred embodiment of the present invention is illustrated, wherein the canopy windshield 20' of stroller 10 is alternatively made detachably attached to the canopy shield 22' of the stroller so that the user may remove the canopy windshield 20' anytime or replace a transparent windshield to a non-transparent one while the baby is sleeping.

Accordingly, the canopy windshield 20' further comprises a fastening means 25' for detachably attaching the front shelter 23' to the canopy shield 22', wherein the fastening means 25' comprises a plurality of first snap fasteners 251' spacedly provided on a front edge 22A portion of the canopy shield 22 and a plurality of second snap fasteners 252' spacedly provided on a rear edge portion of the front shelter 23 in such a manner that the front shelter 23' is adapted for detaching attaching to the canopy shield 22' by detachably fastening the first snap fasteners 251' to the second snap fasteners 252' respectively. The function and operation of such detachable canopy windshield 20' is same as the integral design as shown in FIGS. 1 to 5. However, the front shelter 23' can also be detached from the canopy shield 22' for cleaning and repairing purpose.

It is apparent that the first and second snap fasteners 251', 252' of the fastening means 25' can be replaced by other fastening elements such as hook and loop fasteners respectively.

What is claimed is:

1. A canopy windshield of a stroller which comprises a seat frame and a canopy assembly including a canopy frame supported on said seat frame and a canopy shield supported by said canopy frame to position above said seat frame for shading a top portion of said seat frame, wherein said canopy windshield comprises:

a front shelter, which has a segment-liked shape, having a first edge attached to a front edge of said canopy shield in edge to edge manner and a second edge extended away from said first edge to define a shelter portion therebetween for sheltering a front portion of said seat frame, and a resilient element mounted on said edge of said front shelter in C-shaped manner for applying a tension force on said front shelter so as to retain said front shelter between a folded position and an unfolded position, wherein in said folded position, said resilient element is bent inwardly to overlap said front shelter on an interior side of said canopy shield, and in said unfolded position, said resilient element is bent outwardly to tensely extend said front shelter frontwardly and downwardly from said front edge of said canopy shield.

2. The canopy windshield, as recited in claim 1, wherein said resilient element is an elastic wire mounted along said front edge of said front shelter.

3. The canopy windshield, as recited in claim 2, wherein said resilient element has a length slightly shorter than a length of said front edge of said front shelter such that said resilient element is adapted for freely bending between said folded position and said unfolded position respectively.

4. The canopy windshield, as recited in claim 1, wherein said front shelter has a maximum size equal to a size of said canopy shield enabling said front shelter to be fully overlapped on said interior side of said canopy shield in said folded position, furthermore a curvature of said resilient element is made to match that of said canopy shield.

5. The canopy windshield, as recited in claim 2, wherein said front shelter has a maximum size equal to a size of said canopy shield enabling said front shelter to be fully overlapped on said interior side of said canopy shield in said folded position, furthermore a curvature of said resilient Clement is made to match that of said canopy shield.

6. The canopy windshield, as recited in claim 3, wherein said front shelter has a maximum size equal to a size of said canopy shield enabling said front shelter to be fully overlapped on said interior side of said canopy shield in said folded position, furthermore a curvature of said resilient element is made to match that of said canopy shield.

7. The canopy windshield, as recited in claim 2, wherein said front shelter has a protective brim having a U-shaped cross section attached along said front edge of said front shelter and said resilient element is received in said protective brim.

8. The canopy windshield, as recited in claim 3, wherein said front shelter has a protective brim having a U-shaped cross section attached along said front edge of said front shelter and said resilient element is received in said protective brim.

9. The canopy windshield, as recited in claim 5, wherein said front shelter has a protective brim having a U-shaped cross section attached along said front edge of said front shelter and said resilient element is received in said protective brim.

10. The canopy windshield, as recited in claim 6, wherein said front shelter has a protective brim having a U-shaped cross section attached along said front edge of said front shelter and said resilient element is received in said protective brim.

11. The canopy windshield, as recited in claim 1, further comprising a fastening means for detachably attaching said first edge of said front shelter to said front edge of said canopy shield.

12. The canopy windshield, as recited in claim 2, further comprising a fastening means for detachably attaching said first edge of said front shelter to said front edge of said canopy shield.

13. The canopy windshield, as recited in claim 3, further comprising a fastening means for detachably attaching said first edge of said front shelter to said front edge of said canopy shield.

14. The canopy windshield, as recited in claim 6, further comprising a fastening means for detachably attaching said first edge of said front shelter to said front edge of said canopy shield.

15. The canopy windshield, as recited in claim 9, further comprising a fastening means for detachably attaching said first edge of said front shelter to said front edge of said canopy shield.

16. The canopy windshield, as recited in claim 11, wherein said fastening means comprises at least a first fastener provided on said front edge of said canopy shield and at least a second fastener provided on said first edge of said front shelter in such a manner that said front shelter is adapted for detachably attaching to said canopy shield by detachably fastening said first fastener to said second fastener respectively.

17. The canopy windshield, as recited in claim 12, wherein said fastening means comprises at least a first fastener provided on said front edge of said canopy shield and at least a second fastener provided on said first edge of said front shelter in such a manner that said front shelter is adapted for detachably attaching to said canopy shield by detachably fastening said first fastener to said second fastener respectively.

18. The canopy windshield, as recited in claim 13, wherein said fastening means comprises at least a first fastener provided on said front edge of said canopy shield and at least a second fastener provided on said first edge of said front shelter in such a manner that said front shelter is adapted for detachably attaching to said canopy shield by detachably fastening said first fastener to said second fastener respectively.

19. The canopy windshield, as recited in claim 14, wherein said fastening means comprises at least a first fastener provided on said front edge of said canopy shield and at least a second fastener provided on said first edge of said front shelter in such a manner that said front shelter is adapted for detachably attaching to said canopy shield by detachably fastening said first fastener to said second fastener respectively.

20. The canopy windshield, as recited in claim 15, wherein said fastening means comprises at least a first fastener provided on said front edge of said canopy shield and at least a second fastener provided on said first edge of said front shelter in such a manner that said front shelter is adapted for detachably attaching to said canopy shield by detachably fastening said first fastener to said second fastener respectively.

21. The canopy windshield, as recited in claim 4, wherein said canopy frame comprises an arc-shaped back supporting arm transversely mounted on said stroller and a corresponding arc-shaped front supporting arm having two ends pivotally connected to two ends of said back supporting arm respectively wherein said canopy shield having a predetermined shape is fittedly supported between said back supporting arm and said front supporting arm in such a manner that said canopy shield is adapted for being folded by pivotally rotating said front supporting arm towards said back supporting arm, wherein said curvature of said resilient element matches with that of said back supporting arm of said canopy frame so as to enable said resilient element to be encirclingly aligned with said back supporting arm when said front shelter is folded towards said canopy shield.

22. The canopy windshield, as recited in claim 5, wherein said canopy frame comprises an arc-shaped back supporting arm transversely mounted on said stroller and a corresponding arc-shaped front supporting arm having two ends pivotally connected to two ends of said back supporting arm respectively wherein said canopy shield having a predetermined shape is fittedly supported between said back supporting arm and said front supporting arm in such a manner that said canopy shield is adapted for being folded by pivotally rotating said front supporting arm towards said back supporting arm, wherein said curvature of said resilient element matches with that of said back supporting arm of said canopy frame so as to enable said resilient element to be encirclingly aligned with said back supporting arm when said front shelter is folded towards said canopy shield.

23. The canopy windshield, as recited in claim 19, wherein said canopy frame comprises an arc-shaped back supporting arm transversely mounted on said stroller and a corresponding arc-shaped front supporting arm having two ends pivotally connected to two ends of said back supporting arm respectively wherein said canopy shield having a predetermined shape is fittedly supported between said back supporting arm and said front supporting arm in such a manner that said canopy shield is adapted for being folded by pivotally rotating said front supporting arm towards said back supporting arm, wherein said curvature of said resilient element matches with that of said back supporting arm of said canopy frame so as to enable said resilient element to be encirclingly aligned with said back supporting arm when said front shelter is folded towards said canopy shield.

24. The canopy windshield, as recited in claim 10, wherein said canopy frame comprises an arc-shaped back supporting arm transversely mounted on said stroller and a corresponding arc-shaped front supporting arm having two ends pivotally connected to two ends of said back supporting arm respectively wherein said canopy shield having a predetermined shape is fittedly supported between said back supporting arm and said front supporting arm in such a manner that said canopy shield is adapted for being folded by pivotally rotating said front supporting arm towards said back supporting arm, wherein said curvature of said resilient element matches with that of said back supporting arm of said canopy frame so as to enable said resilient element to be encirclingly aligned with said back supporting arm when said front shelter is folded towards said canopy shield.

25. The canopy windshield, as recited in claim 1, wherein said front shelter is made of transparent plastic having a flexible ability.

26. The canopy windshield, as recited in claim 10, wherein said front shelter is made of transparent plastic having a flexible ability.

27. The canopy windshield, as recited in claim 15, wherein said front shelter is made of transparent plastic having a flexible ability.

28. The canopy windshield, as recited in claim 20, wherein said front shelter is made of transparent plastic having a flexible ability.

29. The canopy windshield, as recited in claim 22, wherein said front shelter is made of transparent plastic having a flexible ability.

30. The canopy windshield, as recited in claim 24, wherein said front shelter is made of transparent plastic having a flexible ability.

\* \* \* \* \*